(12) United States Patent
Saltsidis et al.

(10) Patent No.: US 11,469,917 B2
(45) Date of Patent: Oct. 11, 2022

(54) HYBRID ACCESS TO PREMISES EQUIPMENT USING BOTH FIXED-LINE AND RADIO COMMUNICATIONS

(71) Applicant: Telefonaktiebolaget LM Ericsson (publ), Stockholm (SE)

(72) Inventors: Panagiotis Saltsidis, Stockholm (SE); David Ian Allan, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/770,540

(22) PCT Filed: Dec. 12, 2017

(86) PCT No.: PCT/IB2017/057843
§ 371 (c)(1),
(2) Date: Jun. 5, 2020

(87) PCT Pub. No.: WO2019/116076
PCT Pub. Date: Jun. 20, 2019

(65) Prior Publication Data
US 2021/0167987 A1    Jun. 3, 2021

(51) Int. Cl.
*H04L 12/28* (2006.01)
*H04L 47/125* (2022.01)
(Continued)

(52) U.S. Cl.
CPC ...... *H04L 12/2867* (2013.01); *H04L 12/2898* (2013.01); *H04L 47/125* (2013.01);
(Continued)

(58) Field of Classification Search
CPC ............. H04L 12/2867; H04L 12/2898; H04L 47/125; H04W 28/0231; H04W 72/1226;
(Continued)

(56) References Cited

U.S. PATENT DOCUMENTS

2005/0207397 A1* 9/2005 Berndt .............. H04M 3/42323
370/352
2006/0088054 A1* 4/2006 Tzannes .................. H04L 47/10
370/468
(Continued)

FOREIGN PATENT DOCUMENTS

EP    2365663 A1    9/2011
EP    3021539 A1    5/2016

OTHER PUBLICATIONS

3GPP, "LTE; Evolved Universal Terrestrial, Radio Access Network (E-UTRAN); X2 general aspects and principles", 3GPP TS 36.420 version 12.1.0 Release 12, Technical Specification, ETSI TS 136 420, V12.1.0, Feb. 2015, 15 pages.

*Primary Examiner* — Samina F Choudhry
(74) *Attorney, Agent, or Firm* — Christopher & Weisberg, P.A.

(57) ABSTRACT

Embodiments of the invention provide methods implemented in an access gateway of a network for hybrid access to a promises equipment. In one embodiment, the method comprises obtaining channel state information for both fixed-line and radio interfaces from a premises equipment coupled to the network by both fixed and radio interfaces, wherein a fixed-line path between the access gateway and the premises equipment includes the fixed-line interface coupled to one or more metal or optical fiber lines and a radio path between the access gateway and the premises equipment includes one or more radio interfaces utilizing one or more radio bearers to reach the premises equipment. The method further comprises scheduling transmission of packets of one or more data flows utilizing the fixed-line and radio paths toward the premises equipment based on at least the channel state information.

12 Claims, 7 Drawing Sheets

(51) Int. Cl.
   *H04W 28/02*    (2009.01)
   *H04W 40/10*    (2009.01)
   *H04W 72/04*    (2009.01)
   *H04W 72/12*    (2009.01)
   *H04W 88/16*    (2009.01)
   *H04W 92/02*    (2009.01)

(52) U.S. Cl.
   CPC ....... *H04W 28/0231* (2013.01); *H04W 40/10* (2013.01); *H04W 72/0413* (2013.01); *H04W 72/1226* (2013.01); *H04W 88/16* (2013.01); *H04W 92/02* (2013.01)

(58) Field of Classification Search
   CPC .. H04W 88/16; H04W 72/0413; H04W 40/10
   See application file for complete search history.

(56) References Cited

U.S. PATENT DOCUMENTS

| | | | | |
|---|---|---|---|---|
| 2014/0086174 | A1* | 3/2014 | Nam | H04L 1/0026 370/329 |
| 2014/0376370 | A1* | 12/2014 | Cioffi | H04L 61/2514 370/230 |
| 2015/0223178 | A1* | 8/2015 | Pietraski | H04W 52/325 370/252 |
| 2016/0315808 | A1 | 10/2016 | Saavedra | |
| 2019/0089623 | A1* | 3/2019 | Dion | H04N 21/6118 |

* cited by examiner

FIG. 1

Channel State Information (CSI) for Radio Path (e.g., complying with one of the PUCCH/PDCCH Formats) 202

| Parameters | Values |
|---|---|
| channel quality indicator (CQI) 212 | Value Set 1 |
| precoding matrix indicator 214 | Value Set 2 |
| precoding type indicator (PTI) 216 | Value Set 3 |
| rank indication (RI) 218 | Value Set 4 |

FIG. 2

Channel State Information (CSI) for Fixed-line Path (e.g., complying with one of the PUCCH/PDCCH Formats) 302

| Parameters | Values |
|---|---|
| data rate 312 | Value Set 1 |
| channel delay/jitter/wander 314 | Value Set 2 |
| Bit error rate (BER) 316 | Value Set 3 |

Obtain channel state information for both fixed-line and radio interfaces from a premises equipment coupled to the network by both fixed and radio interfaces, wherein a fixed-line path between the access gateway and the premises equipment includes the fixed-line interface coupled to one or more metal or optical fiber lines and a radio path between the access gateway and the premises equipment includes one or more radio interfaces utilizing one or more radio bearers to reach the premises equipment. 502

Assign unique sequential numbers to packets to be transmitted. 504

Schedule transmission of packets of one or more data flows utilizing the fixed-line and radio paths toward the premises equipment based on at least the channel state information (additionally path state information). 506

Transmit the packets of the one or more data flow through the fixed-line path and/or radio path based on the scheduling (e.g., distributing the packets using X2 interface). 508

Transmit channel state information for both radio and fixed-line and radio path interfaces to an access gateway, wherein a fixed-line path between the access gateway and the premises equipment includes the fixed interface coupled to one or more metal or optical fiber lines and a the radio path between the access gateway and the premises equipment includes uses one or more radio interfaces containing utilizing one or more radio bearers and the fixed-line path uses one or more fixed interfaces coupled to one or more metal or optical fiber lines to reach the access gateway. 602

Receive and identify packets of one or more data flows received from the radio and fixed interfaces. 604

Sort the packets based on a packet sequence of the packets. 606

HYBRID ACCESS TO PREMISES EQUIPMENT USING BOTH FIXED-LINE AND RADIO COMMUNICATIONS

CROSS-REFERENCE TO RELATED APPLICATIONS

This application is a National stage of International Application No. PCT/IB2017/057843, filed Dec. 12, 2017, which is hereby incorporated by reference.

TECHNICAL FIELD

Embodiments of the invention relate to the field of communications; and more specifically, to hybrid access to a premises equipment using both radio and fixed-line communications.

BACKGROUND

A premises equipment such as residential gateway (RG) is a critical component in a communications network to serve households and branch offices. A premise equipment may be deployed to provide a wide variety of services. For home users, a RG may provide voice-over-Internet protocol (VoIP) and entertainment services like on-demand music, gaming, and video streaming. For business users, additionally or alternatively, a business customer premises equipment (CPE) such as a router may provide customer relationship management (CRM) applications, video conferencing, and remote desktop accessing. A premises equipment may provide these services to the home users and business users through either wireless connection such as WiFi, Bluetooth, and small cell, or wired connection such as Ethernet cabling.

Traditionally a premises equipment is an endpoint of a fixed-line communications network. Yet as wireless networks (also referred to as radio network, cellular network) become more readily available and with significantly higher bandwidth obtained via techniques such as multiple-input and multiple-output (MIMO), providing simultaneous access via both a fixed and wireless network (e.g., radio access network (RAN) or radio/microwave network) allows the premises equipment to serve home users and business users based on availability of both networks and with greater overall access bandwidth.

A premises equipment with both fixed-line (also referred to as wireline) access and wireless access is a premises equipment with hybrid access. At the network side, an access gateway needs to coordinate with the premises equipment to provide efficient distribution of traffic between fixed-line access and wireless access to offer services to the home users and business users.

It is challenging to provide efficient information transfer with hybrid access to a premises equipment due to the collective set of dynamic impairments traffic may encounter when spread over both fixed and wireless access.

SUMMARY

Embodiments of the invention provide methods implemented in an access gateway of a network for hybrid access to a promises equipment. In one embodiment, the method comprises obtaining channel state information for both fixed-line and radio interfaces from a premises equipment coupled to the network by both fixed and radio interfaces, wherein a fixed-line path between the access gateway and the premises equipment includes the fixed-line interface coupled to one or more metal or optical fiber lines and a radio path between the access gateway and the premises equipment includes one or more radio interfaces utilizing one or more radio bearers to reach the premises equipment. The method further comprises scheduling transmission of packets of one or more data flows utilizing the fixed-line and radio paths toward the premises equipment based on at least the channel state information.

Embodiments of the invention provide methods implemented in premises equipment that has both fixed-line and radio interfaces. In one embodiment, the method comprises obtaining channel state information for both radio and fixed-line interfaces from an access gateway coupled to a network by both fixed and radio interfaces, wherein a fixed-line path between the access gateway and the premises equipment includes the fixed-line interface coupled to one or more metal or optical fiber lines and a radio path between the access gateway and the premises equipment includes one or more radio interfaces utilizing one or more radio bearers to reach the access gateway. The method further comprises scheduling transmission of packets of one or more data flows utilizing the radio and fixed path toward the access gateway based on at least the channel state information.

Embodiments of the invention provides network devices to implement an access gateway of a network. In one embodiment, a network device comprises a non-transitory machine-readable storage medium to store instructions and a processor coupled with the non-transitory machine-readable storage medium to process the stored instructions, causing the network device to obtain channel state information for both fixed-line and radio interfaces from a premises equipment coupled to the network by both fixed and radio interfaces, wherein a fixed-line path between the access gateway and the premises equipment includes the fixed-line interface coupled to one or more metal or optical fiber lines and a radio path between the access gateway and the premises equipment includes one or more radio interfaces utilizing one or more radio bearers to reach the premises equipment. The network device is further to schedule transmission of packets of one or more data flows utilizing the fixed-line and radio paths toward the premises equipment based on at least the channel state information.

Embodiments of the invention provide network devices to be served as a premises equipment of a network. In one embodiment, a network device comprises a non-transitory machine-readable storage medium to store instructions and a processor coupled with the non-transitory machine-readable storage medium to process the stored instructions, causing the network device to obtain channel state information for both radio and fixed-line interfaces from an access gateway coupled to a network by both fixed and radio interfaces, wherein a fixed-line path between the access gateway and the premises equipment includes the fixed-line interface coupled to one or more metal or optical fiber lines and a radio path between the access gateway and the premises equipment includes one or more radio interfaces utilizing one or more radio bearers to reach the access gateway. The network device is further to schedule transmission of packets of one or more data flows utilizing the radio and fixed path toward the access gateway based on at least the channel state information.

Embodiments of the invention provide efficient ways to provide hybrid access to a premises equipment through both fixed-line and radio interfaces based on at least channel state information.

BRIEF DESCRIPTION OF THE DRAWINGS

The invention may best be understood by referring to the following description and accompanying drawings that are used to illustrate embodiments of the invention. In the drawings:

FIG. 5 illustrates the operations of an access gateway distributing packets of a data flow utilizing a fixed-line path and a radio path per one embodiment of the invention.

FIG. 6 illustrates the operations of a premises equipment receiving packets of a data flow utilizing a fixed-line path and a radio path per one embodiment of the invention.

DETAILED DESCRIPTION

The following description describes methods and apparatus for providing a hybrid access to a premises equipment using both fixed-line and radio communications. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail thus not obscuring the invention. Those of ordinary skill in the art, with the included descriptions, will be able to implement appropriate functionality without undue experimentation.

Terms

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Hybrid access is the coordinated and simultaneous use of two heterogenous access paths (e.g., one wireless path and one fixed-line path). A hybrid access path includes one network connectivity instance through a wireless path or a fixed line path. A hybrid access path group is a set of paths to provide hybrid access service to a data flow. A wireless path may be used to communicate with a wireless network through one or more communication standards, such as new radio (NR), long-term evolution (LTE)—Advanced (LTE-A), LTE, wideband code division multiple access (WCDMA), High-Speed Packet Access (HSPA). The communications may be performed according to any suitable generation communication protocols, including, but not limited to, the third generation (3G), the fourth generation (4G), 4.5G, the fifth generation (5G) communication protocols, and/or any other protocols either currently known or to be developed in the future. A fixed-line path uses a wired connection between a network device and another network device, an end-user device, or other electronic devices. The fixed-line path may be used to communicate with a fixed-line network through one or more communication standards such as digital subscriber lines (xDSLs), hybrid fiber-coaxial (HFC), fiber in the loop (FITL), fiber to the X (FTTX) (where X may be home, FTTH; building/basement, FTTB; desktop FTTD; office, FTTO; telecom enclosure or zone, FTTE/FTTZ; frontage, FTTF; distribution point, FTTdp; curbe/kerb, closet, or cabinet, FTTC/FTTK). The fixed-line may be one or more metal lines such as coaxial and twisted pairs cables, or optical fiber lines.

A hybrid access gateway (HAG) is a logical function implemented in a network device for simultaneous use of both wireless and fixed-line paths. The hybrid access gateway may be coupled to a core and/or metro network in the upstream and an access network in the downstream.

A premises equipment (also referred to as customer premises equipment, CPE) is a network device. A premises equipment may be a residential gateway (RG) to serve residential users or it may be a business CPE to serve business users. Additionally, a premises equipment may be implement as a router, a network switch, a set-top box (STB), a home/business networking adapter, a modem, an Internet access gateway, a computer, or another computing/networking equipment at the last-mile of a network. A premise equipment may have interfaces to access both fixed-line and wireless networks, and such a premises equipment is referred to as a premises equipment with hybrid access.

A premises equipment connects one or more end-user devices connected via premises networking to broadband networks such as an access network, a core and/or metro network. In one embodiment, the premises equipment communicates with an access gateway such as a hybrid access gateway to get broadband access. A premises equipment with hybrid access may be referred to as a hybrid customer premises equipment (HCPE), and a residential gateway with hybrid access may be referred to as a hybrid residential gateway (HRG). A HCPE provides both fixed-line and wireless access to the end-user devices, and it may perform the functions of one or more of a cable modem, a DSL modem, a wireless router, a network switch, a voice over Internet protocol (VoIP) adaption, a wireless access point, and a wired router.

An end-user device is an electronic device that may access a fixed-line and/or a wireless communications network and receive services from communications networks. For example, an end-user device may be referred to as a user equipment (UE), a subscriber station (SS), a portable subscriber Station, a mobile station (MS), or an access terminal (AT). The end-user device may be one of a desktop computer, a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box. The end-user device serves a fixed-line/mobile access subscriber, which may be a human user or an electronic device.

A data flow (or simply "flow") is traffic of packets identified by a set of header information and protocol port information including, but not limited to: IP header, Layer 2 (L2) header, virtual and/or physical interface port, and/or agent circuit ID information for a remote port in an access network. Individual packets in a data flow may be identified by matching a set of attributes common to all packets of the flow. An exemplary set of attributes includes a 5-tuple (source and destination IP addresses, a protocol type, source and destination TCP/UDP ports). A data flow is most efficiently handled by end user devices if delivered in order they were transmitted, as out of order delivery is usually interpreted as an error in information transfer and results in recovery procedures.

Per-packet distribution is a traffic distribution scheme whereby individual packets in the same data flow may be sent over different paths in a hybrid access path group. In contrast, a per-flow distribution is a traffic distribution scheme whereby packets in the same data flow are sent over the same path in the hybrid access path group. Per flow distribution means the maximum transfer rate for that flow is limited by the selected path, whereas per packet distribution permits the transfer rate for a flow to approach that of the sum of the paths in the path group. Per packet distribution also permits useful policies to be implemented such as "fill cheapest path first", whereas per flow distribution may result in poor economies as large flows may be assigned to expensive paths, as there is no a-priori information available as to flow size to intermediate devices in the path.

L3/L4 Hybrid Access, CoMP, and Carrier Aggregation

A hybrid access to a single premises equipment may provide a higher bandwidth, for either upstream, downstream, or in both directions. Additionally, the hybrid access may also provide faster service turn-up time and better reliability. For example, when a new fixed-line access is to be provided to a HCPE, the turn-up through the fixed-line access may be time-consuming due to the requirement to install physical facilities. Yet the HCPE may access services through its radio access first. Once the fixed access is installed and activated, the radio access may be used to improve reliability (back-up and fall-over upon a fixed access failure) or to add capacity.

Yet implementing hybrid access has a number of challenges and complexities. For example, one proposed hybrid access method uses open systems interconnection (OSI) layer 4 (L4) multipath (MP). In this way, the connectivity between a HCPE and a HAG uses a L4 MP transport service enabling Internet protocol (IP) data flow to use multiple paths in a hybrid access path group simultaneously. A L4 MP implementation may use multipath transmission control protocol (MPTCP) sets up multiple TCP sub-flows over the different access networks and utilizes real time HCPE to HAG (or HAG to HCPE) flow control. The HCPE and HAG are responsible for managing the MPTCP path, including establishment and tear down.

While MPTCP is often used for multi-path between multiple wireless interfaces such as between a WiFi interface and a LTE interface (or a WiFi interface and a global system for mobile communications (GSM) interface), MPTCP is access network agnostic thus can be used between a fixed-line network and a wireless network, and no changes are required to either the fixed-line network or the wireless network to implement the MPTCP. Yet the HCPE and HAG terminate the end user OSI layer 4 sessions before transporting the data over the hybrid access paths, thus they effectively execute a proxy function for the end user sessions. The HCPE and HAG also need to maintain flow and session state information, and MPTCP does not provide protocol support for other L4 protocol such as user datagram protocol (UDP) or quick UDP Internet connections (QUIC) either.

Another proposed hybrid access approach uses tunneling. The tunneling may be a OSI L3 overlay tunneling or L3 network-based tunneling. In the L3 overlay tunneling, the HCPE is responsible for managing the tunnel (both establishment and tear down) as well as upstream forwarding decisions. The HAG is responsible for downstream forwarding decisions. The implementation itself is network agnostic, therefore no changes are required to either the fixed-line network or the wireless network. Yet in this implementation, each tunnel endpoint requires a unique IP address, thus a HCPE and HAG may require multiple IP addresses for the hybrid access.

In L3 network-based tunneling, the connectivity between the HCPE and the HAG is realized by making use of the native technologies (e.g. IP over Ethernet (IPoE) or point-to-point over Ethernet (PPPoE)) in fixed-line network and wireless network, from a HCPE to a broadband network gateway (BNG) in the fixed-line network and from the HCPE to a base station in the wireless network, respectively. For example, the wireless side may use IP over GTP (general packet radio service (GPRS) tunneling protocol) and fixed line uses IPoE or PPPoE. In this case, PPPoE does not extend to HAG, only to the BNG; and the extension to the HAG may be accomplished by other means (MP-TCP, generic routing encapsulation (GRE) tunneling, etc.). On setup, the network establishes the tunnels to the HAG on behalf of a subscriber's HCPE and stitches traffic from the access sessions to those tunnels, in order to reach the HAG. Each Hybrid Access path is the end-to-end path resulting from stitching the access session in the respective access network with the corresponding tunnel from the access network to the HAG. In this solution, the HCPE may use a single IP address for both Hybrid Access paths. The same address can be assigned via both access paths from the network.

With both L3/L4 approaches, the receiving proxy gateway is delegated the function of re-ordering the packets received to correspond to the order of transmission, and the sending gateway attempts to schedule the transmission of traffic to minimize the amount of buffering used at the receiving proxy (and hence increased delay) to correct out of order delivery. Out of order delivery is caused by latency variations in the path which can be a result of congestion, radio impairments etc. Hence the quality of information that the sending gateway has access to has a significant impact on the overall rate of information transfer.

While hybrid access to both fixed-line network and wireless network remains challenging, coordinating access over multiple points within a wireless network has been implemented efficiently. For example, in a wireless network, coordinated multipoint transmission (CoMP) has been implemented to access multiple transmission and reception points (e.g., cells). In CoMP operations, multiple points may coordinate with each other in such a way that the transmission signals from/to other points do not incur serious interference to a local transmission signal. The transmission and reception points may be macrocells, picocells, or femtocells, or even relay nodes. The multiple points (e.g., transmission points) obtain channel information from a user equipment (UE), and based on the obtained channel information to determine which cell/antenna to use, and/or what beamforming weight to apply for packet transmission to the UE.

CoMP may be implemented along with carrier aggregation in a wireless network. In a wireless network, carrier aggregation allows a signal transmission use a number of separated carriers. Each aggregated carrier is a component carrier (CC), and the aggregated bandwidth of the aggregated carriers are the sum of the bandwidths of the CCs. For example, if a CC can have a bandwidth of 5, 10, or 20 MHz, and carrier aggregation may aggregate up to five CCs, then the maximum aggregated bandwidth of the carrier aggregation is 100 MHz. The number of component carrier may be used by a number of cells, each cell using one CC. The carrier aggregation is coordinated with radio resource control (RRC) messages in one embodiment, and the coordination of the component carriers may be based on the channel information.

A similar concept of dual or multiple connectivity whereby CCs in non-overlapping spectrum blocks served by different antenna sites may be used to simultaneously transfer information between the premises equipment and the core network.

A key aspect of this is that the quality of any individual radio channel is transitory, and not exposed outside of the corresponding radio access network (RAN). Existing hybrid access solutions do not have a view of the available radio channels and their capacity, and therefore are constrained in terms of the transfer rates they can achieve.

Hybrid Access of Embodiments of the Invention

Since coordinating access over multiple points within a wireless network has been implemented efficiently, it is desirable to leverage the architecture of the coordinated access within the wireless network and to incorporate the features of fixed-line network, so that the coordination may additionally be performed between the fixed-line access and radio access.

In the architecture of the coordinated access within a wireless network, carrier aggregation, dual or multiple connectivity, and CoMP collectively provide a mechanism for distributing packet traffic across a set of interfaces to user equipment. This is typically in the form of multiple blocks of spectrum where the transmission of each block of spectrum may be from a different antenna in a distributed radio access network (RAN) configuration. The receiver has sufficient information to correct any mis-ordering artifacts of latency variations between the different paths to the receiver. This provides the possibility of simply treating the fixed network as an additional antenna with a defined bandwidth capability that can be incorporated into such an architecture.

Figure 1:
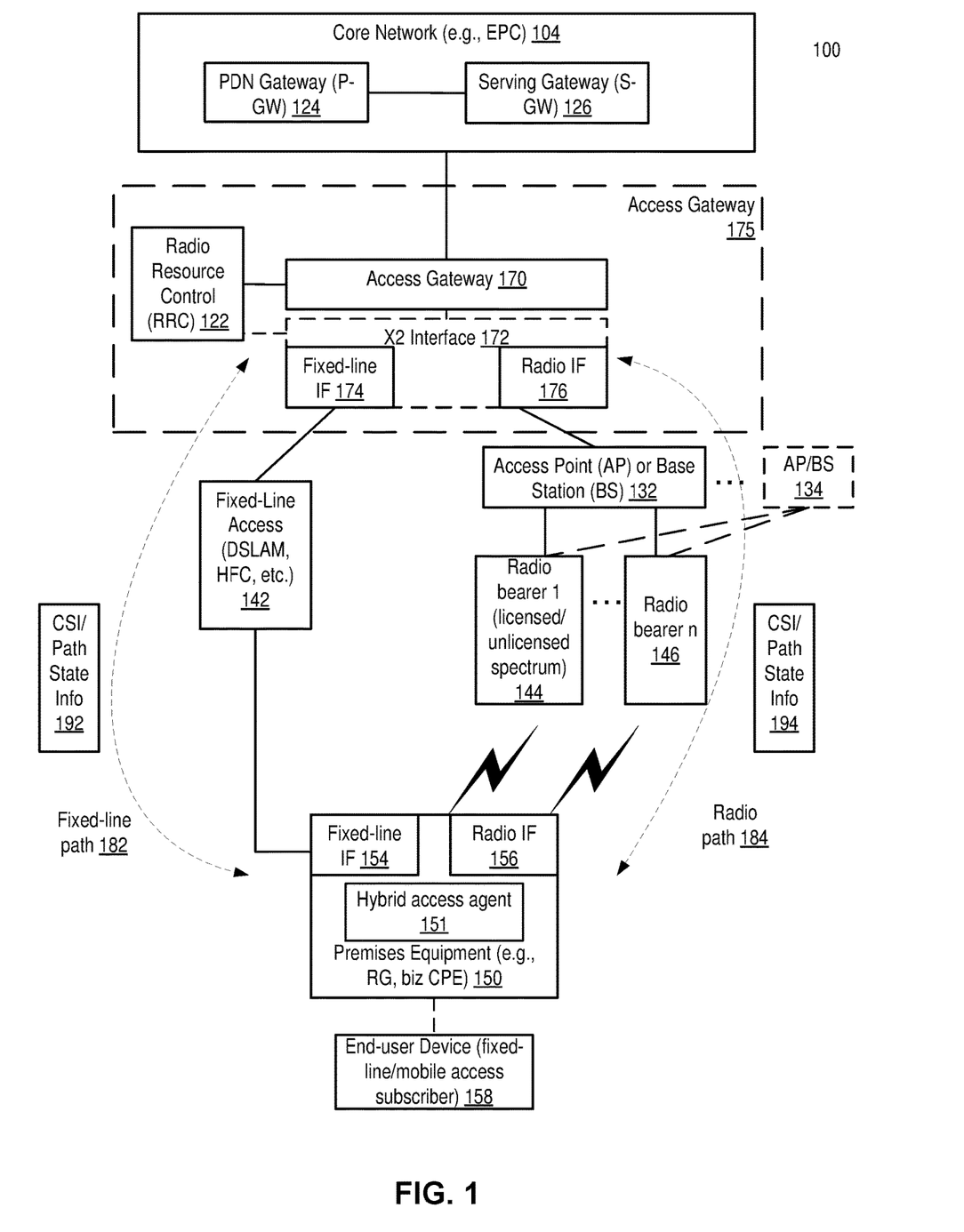
FIG. 1 illustrates providing hybrid access to a premises equipment per one embodiment of the invention.

FIG. 1 illustrates providing hybrid access to a premises equipment per one embodiment of the invention. Network 100 includes a core network 104 and an access network. The access network includes an access gateway 170 to provide hybrid access to premises equipment 150, which in turn provides network access to end-user device 158.

The access gateway 170 provides network access to the core network 104. The core network 104 may be an evolved packet core (EPC) system in one embodiment. The EPC system may include a serving gateway (S-GW) 126, a packet data network gateway (P-GW) 124, both of which are well known in the art, and their functionalities are not detailed herein. In addition or in alternative, the core network 104 may include backbone network that supports both $3^{rd}$ Generation Partnership Project (3GPP) and non-3GPP networks.

The access gateway 170 may be implemented in a network device, and it interacts with one or more fixed-line interfaces such as a fixed-line interface 174, and one or more radio interfaces such as a radio interface 176. The access gateway 170 distributes traffic among the fixed-line and radio interfaces thus sometimes referred to as a traffic distribution access gateway.

The fixed-line interface 174 and radio interface 176 may exchange information with each other and with the access gateway 170 through an X2 interface 172 in one embodiment. An X2 interface is a standardized interface in the art. For example, the X2 interface is defined in ETSI TS 136 420 "LTE Evolved Universal Terrestrial Radio Access Network (E-UTRAN) X2 General Aspects and Principles," by European Telecommunications Standards Institute (ETSI). While the X2 interface is traditionally used for exchanging information between base stations, the X2 interface may also be used to coordinate between fixed-line and radio interfaces in one embodiment of the invention.

A radio resource control (RRC) 122 may be coupled to the access gateway 170 for coordinating the fixed-line interface 174 and radio interface 176. For example, the RRC 122 may handle the CSI and path state information received from the fixed-line interface 174 and radio interface 176. In one embodiment, the RRC 122 interacts with X2 interface 172 for the coordination.

In one embodiment, the access gateway 170 is a functional block of an access gateway 175, which includes the functional block, the X2 interface 172, the Fixed-line interface 174, and/or the radio interface 176. The access gateway 175 is implemented in a network device that contains all the functionalities of these entities in that embodiment.

In an alternative embodiment, one or more of the access gateway, the X2 interface 172, the fixed-line interface 174, and radio interface 176 are implemented in separated network devices. In addition, the fixed-line interface 174 and radio interface 176 may not be collocated at the same physical location as the access gateway 170. In one embodiment, these interfaces, through the X2 interface 172 or not, may be at locations separated from the access gateway 170. In embodiments of the invention, the fixed-line interface 174 may be close to the physical lines deployed for the fixed-line path, while the radio interface 176 may be close to the antenna and/or other hardware of a base station communicating with the premises equipment 150. For simplicity of discussion, examples below discuss the access gateway 170, the X2 interface 172, the fixed-line interface 174, and radio interface 176 as separate entities, but embodiments of the invention apply to scenarios that all or some of the entities are integrated into a same network device.

Through the fixed-line interface 174, the access gateway 170 may communicate with the premises equipment 150 using fixed-line communications. The fixed-line communications may be through a fixed-line access equipment 142, which may be implemented in/as a network device. The fixed-line communication may use protocols such as xDSLs (using DSL access multiplexer (DSLAM)), HFC, FTTX, and other fixed-line protocols. While one end of the fixed-line path 182 is the fixed-line interface 174 for the access gateway 170, the other end is the fixed-line interface 154 of the premises equipment 150.

Through the radio interface 176, the access gateway 170 may communicate with the premises equipment 150 using radio communications. The radio communications may be through one or more access points (APs) or base stations (BSs) such as the ones at references 132 and 134. The access points and/or base stations may be one or more of a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell.

The access points and/or base stations transmit packets through radio bearers (also referred to as bands) such as radio bearer 1 at reference 144 and radio bearer n at reference 146. The radio bearers may be in a licensed spectrum or unlicensed spectrum (also referred to as open spectrum or free spectrum). Operating in a licensed spectrum, an AP/BS may transmit at its allocated bearers while the AP/BS needs to determine the availability of a radio bearer before transmission (e.g., through listen-before-talk, LBT). While one end of the radio path 184 is the radio interface 176 for the access gateway 170, the other end is the radio interface 156 of the premises equipment 150.

The premises equipment 150 contains the fixed-line interface 154 and radio interface 156, thus it is a premises equipment with hybrid access or hybrid customer premises equipment (HCPE). The premises equipment 150 provides services to the end-user device 158 by getting services, through the fixed-line path 182 and radio path 184, from the access gateway 170. The services are delivered to the premises equipment 150 through packets of data flows from the access gateway 170. The premises equipment 150 contains a functional block, a hybrid access agent 151 to coordinate hybrid access at the premises equipment 150. The hybrid access agent 151 may perform functions such as obtaining channel state information, determining using the fixed-line path or the radio path to transmit packets, sorting packets received from the fixed-line path and the radio path, and/or reconstructing data flows from the packets received from the two types of paths.

Instead of providing hybrid access through L3/L4 hybrid access as discussed herein above, embodiments of the invention leverage the existing architecture of the coordinated access within a wireless network. In the coordinated access within the wireless network, channel state information (CSI) is used to indicate a channel status, so that the receiving network device may determine how to transmit packets of data flows to the other end.

Channel state information (CSI) is a term of art in wireless communications. In one embodiment, it is used to describe how a signal propagates from the transmitter to the receiver and represents the combined effect of, for example, scattering, fading, and power decay with distance. Using CSI to gauge the characteristics of a communication path is often referred to as channel estimation. Armed with CSI, a transmitter may adapt its transmission to current channel condition thus achieving reliable wireless communication, particularly when the wireless communication contains multiple antennas, as the transmitter may coordinate among the multiple antennas in a multiple-input and multiple-output (MIMO) system.

Figure 2:
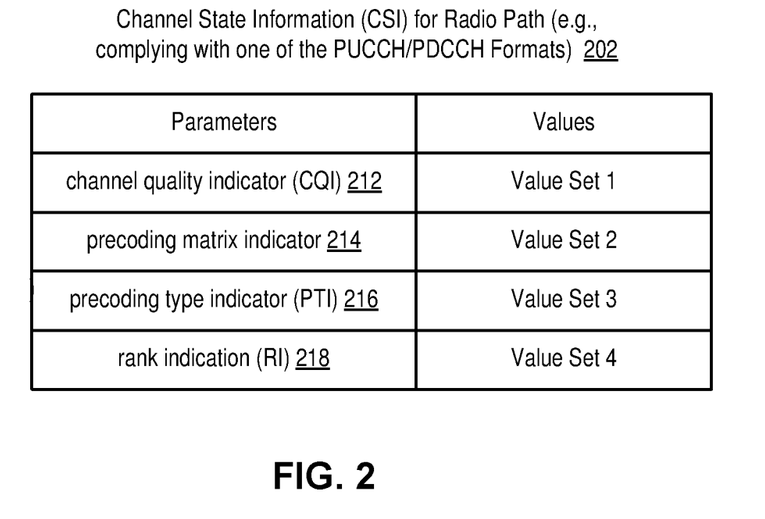
FIG. 2 illustrates channel state information used for a radio path per one embodiment of the invention.

FIG. 2 illustrates channel state information used for a radio path per one embodiment of the invention. The channel state information (CSI) for the radio path is illustrated in a table form of table 202, but it may be presented as a map, a list, an array, a file, a table, a database (relational database or mongo database), etc.

The channel state information may be transmitted from a premises equipment to an access gateway, and the transmission is an upstream transmission (toward the core network). The premises equipment transmits the CSI upstream to indicate the channel condition it experiences/estimates so that the access gateway may adjust its transmission according to the channel condition. The CSI may be transmitted within a physical uplink control channel (PUCCH), thus comply with one of the PUCCH formats (e.g., PUCCH formats 4-5 in LTE).

The channel state information may be transmitted from an access gateway to a premises equipment, and the transmission is a downstream transmission (toward the end-user device). The access gateway transmits the CSI upstream to indicate the channel condition it experiences/estimates so that the premises equipment may adjust its transmission according to the channel condition. The CSI may be transmitted within a physical downlink control channel (PDCCH), thus comply with one of the PDCCH formats (e.g., PUCCH downlink control indicator (DCI) format 0 in LTE).

The channel state information may include channel quality indicator (CQI) 212, which indicates the quality of the communication channel (e.g., an integer within the range of 0~30). When the access gateway receives a value set for the CQI 212 from the premises equipment, it schedules a set of blocks of spectrum based on the CQI value set. The value set may include one or more values, which the premises equipment measures in one embodiment. Reversely, when the premises equipment receives a value set for the CQI 212 from the access gateway, it also schedules a set of blocks of spectrum based on the CQI value set.

The channel state information may include precoding matrix indicator 214, precoding type indicator (PTI) 216, and rank indication (RI) 218), each may have a corresponding value set. These parameters of the CSI information are known in the art of wireless communications thus not explained in detail Similar to CQI 212, the access gateway receives one or more value sets of these parameters, and schedule a set of blocks of spectrums accordingly.

Note that each block of spectrum may be a resource block (RB) in one embodiment. Each RB contains 12 subcarriers in one embodiment. In one embodiment, each subcarrier includes a bandwidth (e.g., 7.5 kHZ or 15 kHZ) for transmission. Each packet contains a number of bytes, which are transmitted using a number of resource blocks.

Figure 3:
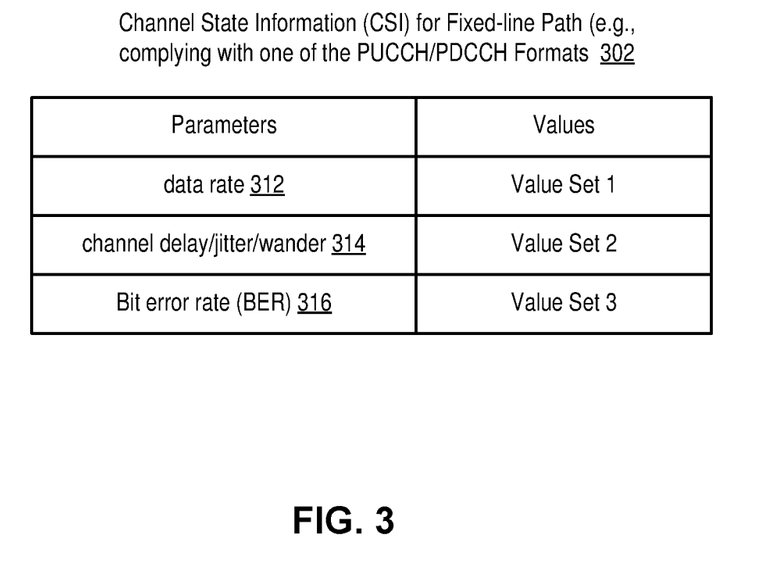
FIG. 3 illustrates channel state information used for a fixed-line path per one embodiment of the invention.

While using CSI to indicate channel condition is known in the art of wireless communications, embodiments of the invention also use the CSI to indicate channel condition for fixed-line communications. FIG. 3 illustrates channel state information used for a fixed-line path per one embodiment of the invention. The channel state information (CSI) for the fixed-line path is illustrated in a table form of table 302, but it may be presented as a map, a list, an array, a file, a table, a database (relational database or mongo database), etc.

Similar to the CSI used for the radio path, the CSI used for the fixed-line path may be transmitted from the premises equipment to the access gateway or vice versa. The CSI at table 302 may include a data rate 312 that the premises equipment/access gateway supports. It may also include one or more channel timing measurements 314 such as channel delay, jitter, or wander, and/or a channel fault rate such as a bit error rate (BER) 316. Each CSI parameter may correspond to a value set, which may include one or more measurements that the access gateway or the premises equipment takes.

The CSI for the fixed-line path characterizes the channel condition for the fixed-line, so that the receiving access gateway/premises equipment may compare the channel condition with another channel condition for another channel for radio communication, and determine which one is a better option to transmit packets or the bandwidth and latencies to be expected such that an instantaneous best weighted distribution of packets across the set of available paths to the receiver can be employed with an expectation of a minimum of reordering being required by the receiver.

The CSI for the fixed-line path may be transmitted in the same format as the CSI for the radio path, i.e., it may comply with one of the PUCCH/PDCCH format. The advantage of such compliance is that the CSI for the fix-line path will be treated similarly as the CSI for the radio path thus the receiver to receive the CSI for both the fixed-line path and radio path may be same or similar thus at a lower layer (e.g., physical layer), the receiving network device does not need to differentiate the two CSIs, and only at the higher layer (e.g., the MAC/RLC/PDCP layer) that the information embedded within the CSI needs to be examined differently for different paths.

Additionally, embodiments of the invention may determine how to access the premises equipment 150 based on additional path state information gleaned from a network device that is intermediate between the access gateway and the premises equipment. The network device may be the fixed-line access equipment 142 or the AP/BS 132-134. The additional path state information may be a congestion notification or a hardware/software failure notification/warning. The additional path state information is particularly useful when the fixed-line interface and the radio interface are not co-located. In that case, we may use X2 interface to coordinate the fixed-line and radio interfaces. To understand which path is better, we need to consider (1) a first path state for the path portion between the fixed-line interface and X2 interface, and (2) a second path state for the path portion between the radio interface and X2 interface. Thus, the additional path state information provides a fuller picture of the relative advantages of the fixed-line and radio communications and would factor into any weighted distribution scheme.

Referring back to FIG. 1, the channel state information and/or the path state information may be transmitted through the fixed-line path 182 at reference 192 or through the radio path 184 at reference 194. While in one embodiment, each path carries its own channel state information (e.g., the fixed-line path 182 carries the channel state information for fixed-line communications only and the radio path 184 carries the channel state information for radio communications only), each path may carry channel state information for other means of communications in an alternative embodiment.

For example, the fixed-line path may carry the channel state information for the radio communications. When the fixed-line path 182 is in a fault-free state, the fixed-line path 182 may carry the channel state information for the radio communication between the premises equipment 150 and the access gateway 170. A fixed-line path often has a higher bandwidth and/or error rate when it operates in a fault-free state comparing to a corresponding radio path of the same premises equipment, and having the fixed-line path carries the channel state information for all the channels (fixed-line and radio) may be more reliable.

Reversely, the radio path may carry the channel state information for the fixed-line communications. When the fixed-line path 182 is in a transient state (initiating/resetting/handing over), it is more efficient for the radio path 184 to carry the channel state information for the fixed-line communication between the premises equipment 150 and the access gateway 170.

Note that embodiments of the invention use channel state information for both the fixed-line and radio communications for hybrid access. The channel state information indicates the condition of channel/path. Thus, instead of providing hybrid access at OSI L3/4 level, embodiments of the invention provide hybrid access to a premises equipment at OSI L1/2 level. The advantages over the existing L3/4 approaches are multifold. Existing solutions treat the fixed access as a single path, and the radio access as a single path. The reality is that there is a plurality of radio paths, and with the addition of new spectrum and antenna densification has an increasingly richer topology, which existing solutions cannot take advantage of, the richness is simply not exposed. By treating the fixed-line access path being an option in addition to the plurality of radio paths, the access to a premises equipment is much more efficient.

Figure 4:
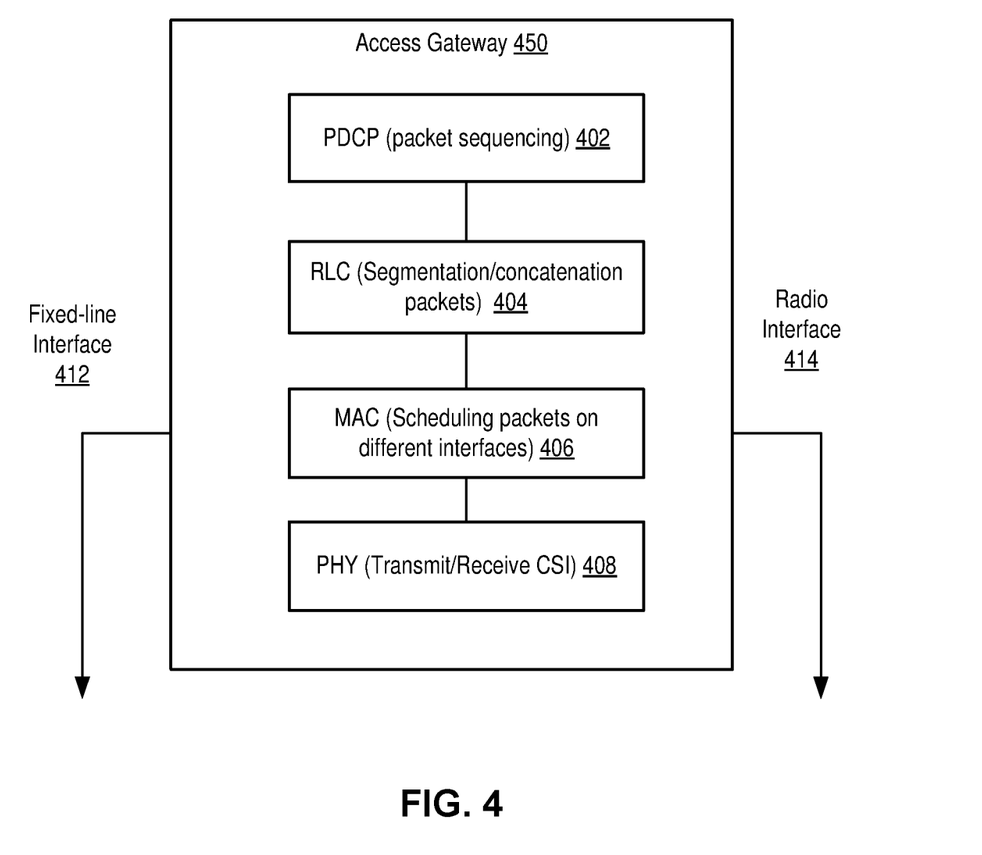
FIG. 4 illustrates operations of hybrid access per one embodiment of the invention.

FIG. 4 illustrates operations of hybrid access per one embodiment of the invention. The hybrid access operations are performed by an access gateway 450, which operates similarly as the access gateway 170 discussed herein above. The access gateway 450 is coupled to a fixed-line interface 412 and a radio interface 414. The fixed-line interface 412 is a part of a fix-line path through which the access gateway 450 communicates with a premises equipment. Similarly, the radio interface 414 is a part of a radio path through which the access gateway 450 communicates with a premises equipment.

At physical layer 408, the access gateway 450 receives CSI transmitted from a premises equipment (e.g., the premises equipment 150) in upstream direction in a physical layer 408. The CSI may be received from the fixed-line interface 412 or the radio interface 414. In the downstream direction, once the access gateway 450 determines channel conditions (e.g., by taking measurements), it transmits CSI to one or more premises equipment (e.g., the premises equipment 150). The CSI may be transmitted through either the fixed-line interface 412 or the radio interface 414.

When the access gateway 450 has packets of a data flow to be transmitted to a premise equipment. The access gateway 450 provides sequencing information of the packets in the packet data convergence protocol (PDCP) layer 402. The PDCP layer provides unique packet sequence numbers to the packets of the data flow and generate packet data units (PDUs) for the packets. The PDCP protocol may cause the PDUs generated at the PDCP layer 402 further process at the radio link control (RLC) layer 404. At the RLC layer 404, the PDUs may be segmented or concatenated to be prepared for transmission. Then the PDUs are scheduled to be transmitted at different interfaces at media access control (MAC) layer 406. At the MAC layer 406, the packets are distributed between the fixed-line interface 412 and radio interface 414 based on the received CSI from the physical layer.

The packets distribution is based on the channel conditions of the fixed-line and radio paths in one embodiment. The access gateway may compare the received CSI for the fixed-line path with the received CSI for the radio path, and determine which path is better for the packets. For example, when the CSIs indicate that the fixed-line path is fault free and is capable of carrying a higher bit rate than that of the radio path, packets of the data flow may be transmitted through the fixed-line interface. Reversely, when the CSIs indicate that the radio path can transmit the packets at a higher bit rate than the fixed-line path, the packets may be transmitted through the radio-line interface.

Additionally, the packet distribution may be based on additional path state information gleaned from a network device that is intermediate between the access gateway 450 and the premises equipment. For example, the network device may be a fixed-line access equipment 142 or the AP/BS 132-134.

The packet distribution between the fixed-line interface and the radio interface may be performed at per packet basis. In this case, the packets of one or more data flows are load-balanced between the fixed-line interface and the radio interface, and each path is distributed with packets at a volume that is proportional to its bit rate and latency so that both paths are used efficiently. In this case, the receiving access gateway/premises equipment will sort the packets receives from a plurality of interfaces to reconstruct the one or more data flows.

The packet distribution between the fixed-line interface and the radio interface may be performed at per data flow basis. For example, the access gateway 450 may determine that the radio path is more stable (e.g., less BER) based on the CSI for the radio path than the fixed-line path, and transmit all packets of the data flow through the radio interface 414. The access gateway 450 continues examining the CSIs received from the fixed-line path and radio path, and sometime later determines that the fixed-line path becomes more stable, and the packets are then switched to be transmitted through the fixed-line interface 412. In this case, one type of interface serves as the backup of the other type of interface, and having the two types of interfaces make the hybrid access from the access gateway to a premises equipment more robust.

Flow Diagrams

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Embodiments of the invention may be implemented in an access gateway or a premises equipment of a network. FIG. 5 illustrates the operations of an access gateway distributing packets of a data flow utilizing a fixed-line path and a radio path per one embodiment of the invention. The operations of method 500 may be performed in an access gateway such as the access gateway 170 or 450.

The operations starts with the access gateway receiving channel state information in the upstream direction. At reference 502, the access gateway obtains channel state information for both fixed-line and radio interfaces from a premises equipment coupled to the network by both fixed and radio interfaces. A fixed-line path between the access gateway and the premises equipment includes the fixed-line interface (e.g., the fixed-line interface 174) coupled to one or more metal or optical fiber lines; and a radio path between the access gateway and the premises equipment includes one or more radio interfaces (e.g., the radio interface 176) utilizing one or more radio bearers to reach the premises equipment. In one embodiment, the one or more radio bearers includes bearers in both licensed and unlicensed spectrums.

The channel state information for the fixed-line interface includes one or more measurements of the one or more metal or optical fiber lines: data rate, delay, and bit error rate in one embodiment. The measurements are provided by the premises equipment in one embodiment.

In one embodiment, the channel state information for the fixed-line interface is transmitted in a format compatible to a physical uplink control channel (PUCCH) format. In one embodiment, the channel state information for the radio interfaces is received via the fixed-line interface when the fixed-line interface in a fault free state.

Optionally at reference 504, the access gateway assigns unique sequential numbers to the packets to be transmitted. The packets may belong to one or more data flows. The unique sequential numbers may be a part of metadata added to the packets (e.g., in the packets' headers). Note that the unique sequential numbers for all the packets to be transmitted in one embodiment, and packets in different data flows may not have the same sequential number in that embodiment.

At reference 506, the access gateway schedules transmission of the packets to be transmitted utilizing the fixed-line and radio paths toward the premises equipment based on at least the channel state information. In one embodiment, the scheduling is further based on path state information gleaned from a network device that is intermediate between the access gateway and the premises equipment as discussed herein above.

In one embodiment, the scheduling is coordinated through a packet data convergence protocol (PDCP) as discussed relating to FIG. 4.

At reference 508, the access gateway transmits the packets of the one or more data flows through the fixed-line path and/or the radio path based on the scheduling. The packets are distributed between the fixed-line interface and the radio interface using X2 interface in one embodiment.

Note that while the operations at reference 504 as illustrated are ahead of the operations at reference 506, in some embodiment, the operations at reference 506 may happen prior to the operations at reference 504. In other words, the assigning the unique sequential numbers may occur after the packets are scheduled to be transmitted.

FIG. 6 illustrates the operations of a premises equipment receiving packets of a data flow utilizing a fixed-line path and a radio path per one embodiment of the invention. The operations of method 600 may be performed in a premises equipment such as the premises equipment 150, more specifically, the hybrid access agent 151.

The operations starts with the premises equipment transmitting channel state information in the upstream direction. At reference 602, the premises equipment transmits channel state information for both fixed-line and radio interfaces to an access gateway. A fixed-line path between the access gateway and the premises equipment includes the fixed-line interface (e.g., the fixed-line interface 154) coupled to one or more metal or optical fiber lines; and a radio path between the access gateway and the premises equipment includes one or more radio interfaces (e.g., the radio interface 156) utilizing one or more radio bearers to reach the access gateway. In one embodiment, the one or more radio bearers includes bearers in both licensed and unlicensed spectrums.

At reference 604, the premises equipment receives and identifies packets of one or more data flows received from the radio and fixed interfaces. At reference 606, the premises equipment sorts the packets based on a packet sequence of the packets. In one example, the packet sequence is indicated by unique sequential numbers of packets within the metadata of the packet headers. The one or more data flows may be reconstructed by sorting the packets based on sequence numbers of the packets. The one or more data flows may then be provided to an end-user device such as the end-user device 158 so that a fixed-line or mobile access subscriber may obtain a service provided by the one or more data flows.

In methods 500 and 600, an access gateway makes the traffic distribution decision based on the channel state information from a premises equipment (and optionally based on path state information from an intermediate network device), and the premises equipment reconstructs packets in one or more data flows that may have been distributed between a fixed-line path and a radio path Similar methods may be performed reversely, where a premises equipment makes the traffic distribution decision based on the channel state information from an access gateway, and the access gateway reconstructs one or more data flows whose packets may have been distributed between a fixed-line path and a radio path.

Figure 7:
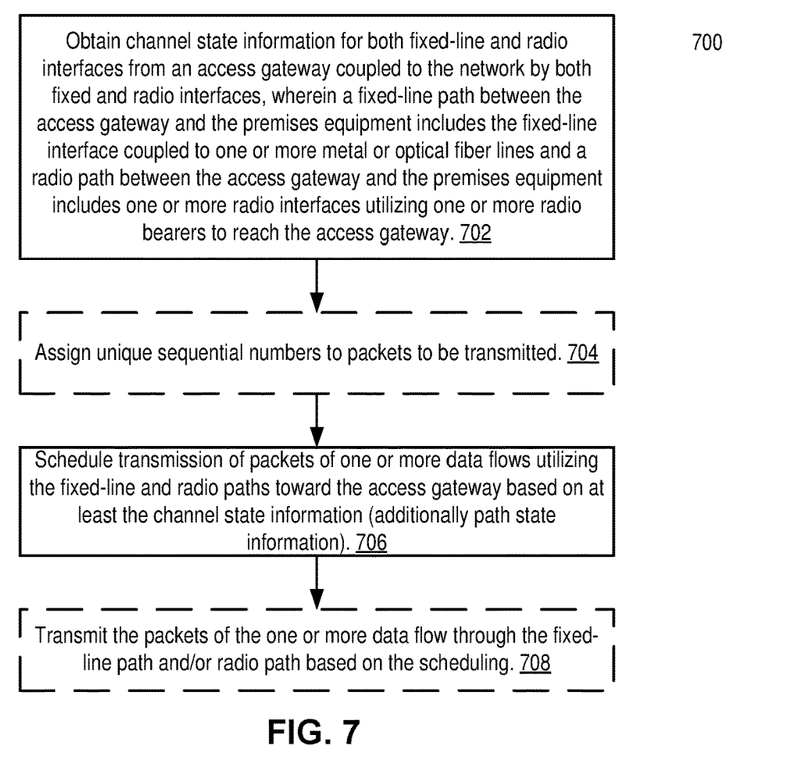
FIG. 7 illustrates the operations of a premises equipment distributing packets of a data flow utilizing a fixed-line path and a radio path per one embodiment of the invention.

FIG. 7 illustrates the operations of a premises equipment distributing packets of a data flow utilizing a fixed-line path and a radio path per one embodiment of the invention. The operations of method 700 may be performed in a premises equipment such as the premises equipment 150, more specifically, the hybrid access agent 151. Method 700 is similar to method 500 but in a reverse direction (the former at downstream direction and the latter upstream direction).

The operations starts with the premises equipment receiving channel state information in the downstream direction. At reference 702, the premises equipment obtains channel state information for both fixed-line and radio interfaces from an access gateway coupled to a network by both fixed and radio interfaces. A fixed-line path between the access gateway and the premises equipment includes the fixed-line interface (e.g., the fixed-line interface 154) coupled to one or more metal or optical fiber lines; and a radio path between the access gateway and the premises equipment includes one or more radio interfaces (e.g., the radio interface 156) utilizing one or more radio bearers to reach the access gateway. In one embodiment, the one or more radio bearers includes bearers in both licensed and unlicensed spectrums.

The channel state information for the fixed-line interface includes one or more measurements of the one or more metal or optical fiber lines: data rate, delay, and bit error rate in one embodiment. The measurements are provided by the access gateway in one embodiment.

In one embodiment, the channel state information for the fixed-line interface is transmitted in a format compatible to a physical downlink control channel (PDCCH) format. In one embodiment, the channel state information for the radio interfaces is received via the fixed-line interface when the fixed-line interface in a fault free state.

Optionally at reference 704, the premises equipment assigns unique sequential numbers to the packets to be transmitted. The unique sequential numbers may be a part of metadata added to the packets (e.g., in the packets' headers).

At reference 706, the premises equipment schedules transmission of packets of one or more data flows utilizing the fixed-line and radio paths toward the access gateway based on at least the channel state information. In one embodiment, the scheduling is further based on path state information gleaned from a network device that is intermediate between the access gateway and the premises equipment as discussed herein above.

At reference 708, the premises equipment transmits the packets of the one or more data flows through the fixed-line path and/or the radio path based on the scheduling. The packets are distributed between the fixed-line interface and the radio interface in one embodiment.

Note that while the operations at reference 704 as illustrated are ahead of the operations at reference 706, in some embodiment, the operations at reference 706 may happen prior to the operations at reference 704. In other words, the assigning the unique sequential numbers may occur after the packets are scheduled to be transmitted.

Figure 8:
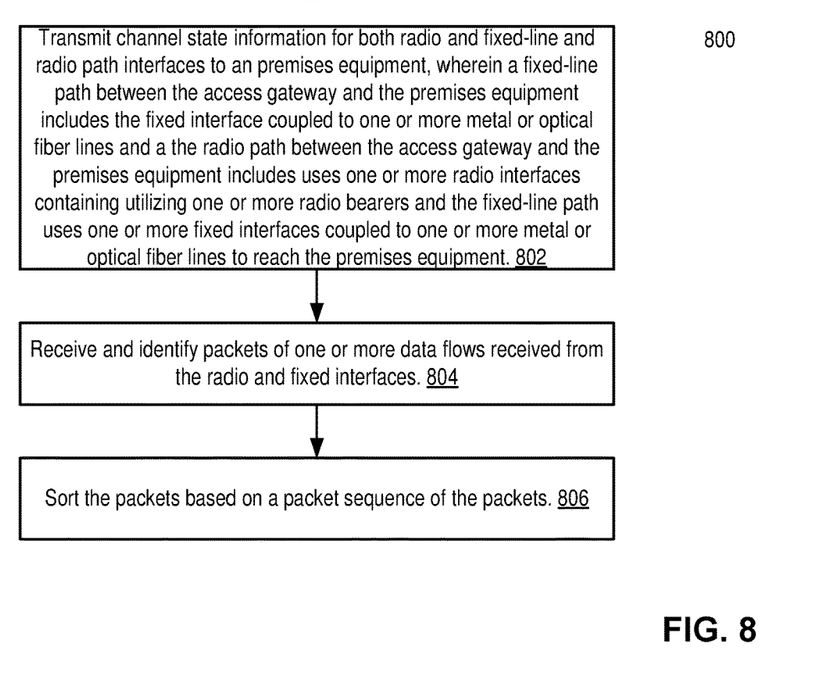
FIG. 8 illustrates the operations of an access gateway receiving packets of a data flow utilizing a fixed-line path and a radio path per one embodiment of the invention.

FIG. 8 illustrates the operations of an access gateway receiving packets of a data flow utilizing a fixed-line path and a radio path per one embodiment of the invention. The operations of method 800 may be performed in an access gateway such as the access gateway 170 or 450.

The operations starts with the access gateway transmitting channel state information in the downstream direction. At reference 802, the access gateway transmits channel state information for both fixed-line and radio interfaces to premises equipment. A fixed-line path between the access gateway and the premises equipment includes the fixed-line interface (e.g., the fixed-line interface 174) coupled to one or more metal or optical fiber lines; and a radio path between the access gateway and the premises equipment includes one or more radio interfaces (e.g., the radio interface 176) utilizing one or more radio bearers to reach the access gateway. In one embodiment, the one or more radio bearers includes bearers in both licensed and unlicensed spectrums.

At reference 804, the access gateway receives and identifies packets of one or more data flows received from the radio and fixed interfaces. At reference 806, the access gateway sorts the packets based on a packet sequence of the packets. In one example, the packet sequence is indicated by unique sequential numbers of packets within the metadata of the packet headers. The one or more data flows may be reconstructed by sorting the packets based on sequence numbers of the packets. The one or more data flows may then be sent to the core network so that a fixed-line or mobile access subscriber may obtain a service provided by the core network.

Electronic Devices Utilizing Embodiments of the Invention

Figure 9:
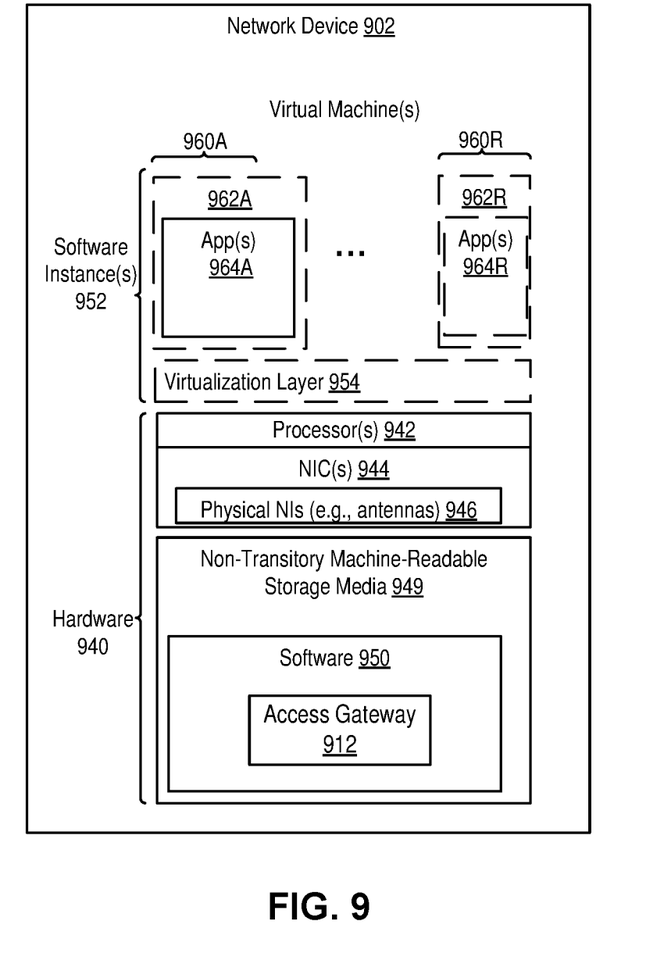
FIG. 9 illustrates a network device per one embodiment of the invention.

FIG. 9 illustrates a network device per one embodiment of the invention. The network device 902 implements an access gateway 912, which may perform operations that performed by the access gateway 170 or 450. The network device 902 may be implemented using custom application-specific integrated-circuits (ASICs) as processors and a special-purpose operating system (OS), or common off-the-shelf (COTS) processors and a standard OS.

The network device 902 includes hardware 940 comprising a set of one or more processors 942 (which are typically COTS processors or processor cores or ASICs) and physical NIs 946, as well as non-transitory machine-readable storage media 949 having stored therein software 950. During operation, the one or more processors 942 may execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R run on top of a guest operating system within an instance 962A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1740, directly on a hypervisor (in which case the unikernel is sometimes described as running within a LibOS virtual machine), or in a software container, embodiments can be implemented fully with unikernels running directly on a hypervisor represented by virtualization layer 1754, unikernels running within software containers represented by instances 1762A-R, or as a combination of unikernels and the above-described techniques (e.g., unikernels and virtual machines both run directly on a hypervisor, unikernels and sets of applications that are run in different software containers).

The software 950 contains the access gateway 912 that performs operations in the exemplary methods 500 and 700 described with reference to FIGS. 5 and 7. The access gateway 912 may be instantiated within the applications 964A-R. The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network device 1760A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 1746 may include one or more antenna of the network device 1702. An antenna port may or may not correspond to a physical antenna.

The network device may include a plurality of interfaces. For example, one network interface may be the fixed-line interface 174 or 412, and another network interface may be the radio interface 176 or 414. In an alternative embodiment, the network interfaces of the network device 902 are coupled to the fixed-line interface or radio interface. For example, the network interface may be coupled to the fixed-line interface or radio interface through a X2 interface.

Figure 10:
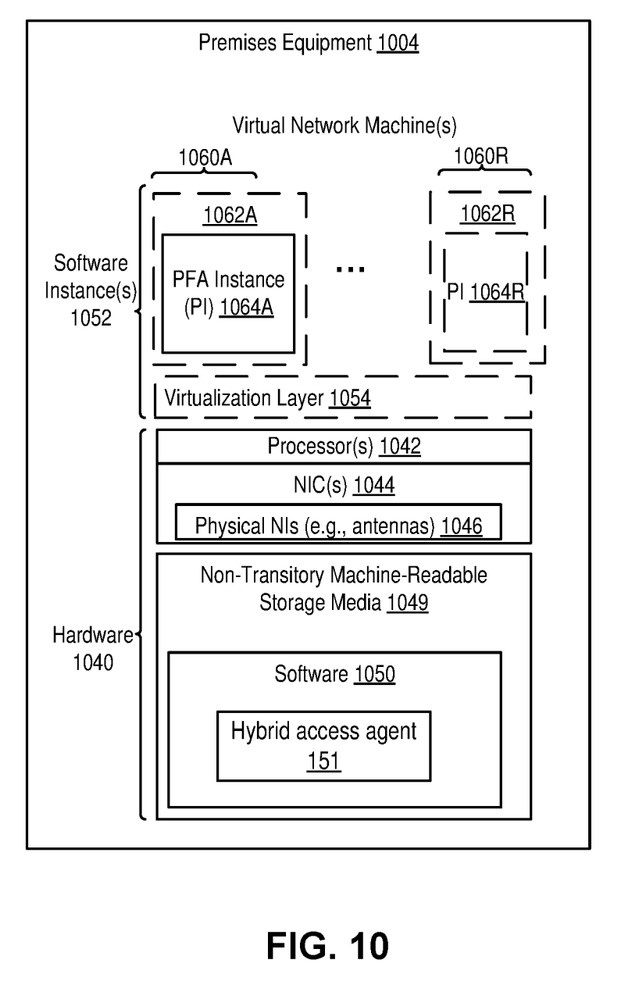
FIG. 10 illustrates a premises equipment per one embodiment of the invention.

FIG. 10 illustrates a premises equipment per one embodiment of the invention. The premises equipment 1004 may be the premises equipment 150. The premises equipment 1004 as illustrated may contain similar or different hardware/software comparing to the network device 902. The functional blocks in FIG. 10 with similar reference numbers as FIG. 9 may perform same or similar functions. Particularly, the physical network interface 1046 may include one or more antenna of the premise equipment 1004, and an antenna port may or may not corresponds to a physical antenna. Also, the premises equipment 1004 may include a plurality of interfaces. For example, one network interface may be the fixed-line interface 154, and another network interface may be the radio interface 156.

The non-transitory machine-readable storage media 1049 may contain software 1050, which includes the hybrid access agent 151. The hybrid access agent 151 may perform operations in the exemplary methods 600 and/or 800 described with reference to FIGS. 6 and 8.

Additionally, the premises equipment 1004 may optionally further include input/output (I/O) devices such as display control and/or display device unit, video I/O device unit(s), audio I/O device unit(s), and other I/O device units.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a premises equipment that has both fixed-line and radio interfaces, the method comprising:
    obtaining channel state information for both radio and fixed-line interfaces from an access gateway coupled to a network by both fixed and radio interfaces, the channel state information for the radio interfaces being received via the fixed-line interface when the fixed-line interface is in a fault free state, a fixed-line path between the access gateway and the premises equipment including the fixed-line interface coupled to one or more metal or optical fiber lines and a radio path between the access gateway and the premises equipment including one or more radio interfaces utilizing one or more radio bearers to reach the access gateway, and channel state information for the fixed-line interface including one or more measurements of the one or more metal or optical fiber lines including data rate, delay, and bit error rate; and
    scheduling transmission of packets of one or more data flows utilizing the radio and fixed path toward the access gateway based on at least the channel state information including the one or more measurements of the one or more metal or optical fiber lines including data rate, delay, and bit error rate, the scheduling also being based on path state information gleaned from a network device that is intermediate between the access gateway and the premises equipment.

2. The method of claim 1, further comprising:
    before scheduling the transmission of the packets to the fixed-line and radio paths, assigning unique sequential numbers to the packets.

3. The method of claim 1, wherein the channel state information for the fixed-line interface is transmitted in a format compatible to a physical downlink control channel (PDCCH) format.

4. A network device to implement an access gateway, of a network, the network device comprising:
    a non-transitory machine-readable storage medium to store instructions; and
    a processor coupled with the non-transitory machine-readable storage medium to process the stored instructions, causing the network device to:
        obtain channel state information for both fixed-line and radio interfaces from a premises equipment coupled to the network by both fixed and radio interfaces, the channel state information for the radio interfaces being received via the fixed-line interface when the fixed-line interface is in a fault free state, a fixed-line path between the access gateway and the premises equipment including the fixed-line interface coupled to one or more metal or optical fiber lines and a radio path between the access gateway and the premises equipment including one or more radio interfaces utilizing one or more radio bearers to reach the premises equipment, and channel state information for the fixed-line interface including one or more measurements of the one or more metal or optical fiber lines including data rate, delay, and bit error rate, and
        schedule transmission of packets of one or more data flows utilizing the fixed-line and radio paths toward the premises equipment based on at least the channel state information including the one or more measurements of the one or more metal or optical fiber lines including data rate, delay, and bit error rate, the scheduling further being based on path state information gleaned from a network device that is intermediate between the access gateway and the premises equipment.

5. The network device of claim 4, wherein the network device is further to:
    before scheduling the transmission of the packets to the fixed-line and radio paths, assign unique sequential numbers to the packets.

6. The network device of claim 4, wherein the channel state information for the fixed-line interface is transmitted in a format compatible to a physical uplink control channel (PUCCH) format.

7. The network device of claim 4, wherein the scheduling is coordinated through a packet data convergence protocol (PDCP).

8. The network device of claim 4, wherein the one or more radio bearers includes bearers in both licensed and unlicensed spectrums.

9. The network device of claim 4, wherein the packets of the one or more data flows are distributed from the access gateway to the fixed-line and radio interfaces using X2 interface.

10. A network device to be served as a premises equipment of a network, the network device comprising:

a non-transitory machine-readable storage medium to store instructions; and a processor coupled with the non-transitory machine-readable storage medium to process the stored instructions, causing the network device to:

obtain channel state information for both radio and fixed-line interfaces from an access gateway coupled to a network by both fixed and radio interfaces, the channel state information for the radio interfaces being received via the fixed-line interface when the fixed-line interface is in a fault free state, a fixed-line path between the access gateway and the premises equipment including the fixed-line interface coupled to one or more metal or optical fiber lines and a radio path between the access gateway and the premises equipment including one or more radio interfaces utilizing one or more radio bearers to reach the access gateway, and channel state information for the fixed-line interface including one or more measurements of the one or more metal or optical fiber lines including data rate, delay, and bit error rate; and schedule transmission of packets of one or more data flows utilizing the radio and fixed path toward the access gateway based on at least the channel state information including the one or more measurements of the one or more metal or optical fiber lines including data rate, delay, and bit error rate, the scheduling further being based on path state information gleaned from a network device that is intermediate between the access gateway and the premises equipment.

11. The network device of claim 10, further comprising:

before scheduling the transmission of the packets to the fixed-line and radio paths, assigning unique sequential numbers to the packets.

12. The network device of claim 10, wherein the channel state information for the fixed-line interface is transmitted in a format compatible to a physical downlink control channel (PDCCH) format.

* * * * *